United States Patent
Talit

(10) Patent No.: US 12,457,919 B2
(45) Date of Patent: Nov. 4, 2025

(54) MOTORIZED MATERIAL DISPENSING GARDENING APPARATUS

(71) Applicant: Uzi Talit, Lakeland, FL (US)

(72) Inventor: Uzi Talit, Lakeland, FL (US)

( * ) Notice: Subject to any disclaimer, the term of this patent is extended or adjusted under 35 U.S.C. 154(b) by 0 days.

(21) Appl. No.: 18/804,911

(22) Filed: Aug. 14, 2024

(65) Prior Publication Data
US 2025/0089603 A1      Mar. 20, 2025

(30) Foreign Application Priority Data
Sep. 20, 2023   (IL) .......................................... 306106

(51) Int. Cl.
| | |
|---|---|
| *A01C 15/04* | (2006.01) |
| *A01C 7/16* | (2006.01) |
| *A01C 15/02* | (2006.01) |
| *A01G 20/47* | (2018.01) |
| *A01M 7/00* | (2006.01) |

(52) U.S. Cl.
CPC ............... *A01C 7/16* (2013.01); *A01C 15/02* (2013.01); *A01C 15/04* (2013.01); *A01G 20/47* (2018.02); *A01M 7/0021* (2013.01)

(58) Field of Classification Search
CPC ........... A01C 7/17; A01C 15/05; A01C 15/02; A01G 20/47; A01M 1/0021
USPC .................................................. 239/655, 676
See application file for complete search history.

(56) References Cited

U.S. PATENT DOCUMENTS

| | | | |
|---|---|---|---|
| 5,119,993 A * | 6/1992 | Gunzel, Jr. ............ | A01C 15/02 406/102 |
| 5,862,940 A | 1/1999 | Chism et al. | |
| 6,105,206 A | 8/2000 | Tokumaru et al. | |
| 6,752,328 B2 * | 6/2004 | Sauls ....................... | A01C 7/08 239/176 |
| 6,810,822 B1 | 11/2004 | Chan | |
| 7,065,944 B1 | 6/2006 | Steele | |
| 11,793,107 B2 | 10/2023 | Talit | |
| 2007/0034710 A1 * | 2/2007 | Elrod ..................... | B05B 3/087 239/379 |

(Continued)

FOREIGN PATENT DOCUMENTS

| | | |
|---|---|---|
| EP | 2153714 A1 | 2/2010 |
| EP | 2371759 A1 | 10/2011 |

(Continued)

*Primary Examiner* — Jason J Boeckmann
(74) *Attorney, Agent, or Firm* — The Roy Gross Law Firm, LLC; Roy D. Gross

(57) ABSTRACT

A motorized gardening apparatus with a container assembly configured to contain a variable supply of material, an air-blowing assembly powered by a battery, an activation controller, a dispensing conduit forming flow communication between an exit valve of the container assembly, the air-blowing assembly and at least one dispensing outlet in a distal end of the dispensing conduit. The dispensing apparatus may be activated in at least two modes of operation: a first mode of operation wherein the exit valve is closed, such that air stream from air blowing assembly is pushed out from the dispensing conduit through the dispensing outlet and a second mode of operation wherein the exit valve in the container assembly is open, such that material from the container assembly is released into the dispensing conduit and pushed by air stream out from the dispensing conduit through the dispensing outlet.

20 Claims, 12 Drawing Sheets

(56) References Cited

U.S. PATENT DOCUMENTS

2016/0345488 A1\* 12/2016 Reitzel ................ A01M 9/0046
2018/0352800 A1   12/2018 Franks et al.

FOREIGN PATENT DOCUMENTS

| EP | 2441325 A1 | 4/2012 |
| FR | 2808412 A1 | 11/2001 |
| IL | 289208 A | 2/2022 |
| JP | 2000236760 A | 9/2000 |
| KR | 200282125 Y1 | 7/2002 |
| WO | 2004060047 A2 | 7/2004 |
| WO | 2013100866 A1 | 7/2013 |
| WO | 2018229792 A2 | 12/2018 |
| WO | 2022/190078 A1 | 9/2022 |

\* cited by examiner 507a
507b

MOTORIZED MATERIAL DISPENSING GARDENING APPARATUS

CROSS REFERENCE TO RELATED APPLICATIONS

This application claims the benefit of priority of Israeli Patent Application No. 306106, filed Sep. 20, 2023, the contents of which are all incorporated herein by reference in their entirety.

TECHNICAL FIELD

The present invention relates generally to gardening devices, more specifically, to portable motorized gardening devices for dispensing materials on the soil.

BACKGROUND OF THE DISCLOSURE

Gardeners take pride in their gardens. It requires regular maintenance such as cutting, trimming and fertilizing. Materials such as fertilizer, pesticide, weed-killing chemicals, grass seeds, rodents and snake repellent and the like may be dispensed over all or a portion of the area using a material spreader. However, it is important to ensure that such materials can reach the soil beneath.

Before spreading materials, it is necessary to remove any object that may interfere with the contact between the material and the soil, hinder the absorption of materials in the soil or avoid the effective distribution of materials into the soil. In addition, there is a need for a device that will be convenient to use to effectively spread such materials.

Material spreaders that exist today do not deal with the difficulties of effectively spreading materials into and on the soil and they do not allow a convenient, precise and efficient distribution of the materials.

Cultivating and maintaining a garden may take a lot of time and effort. The need to remove leaves and weeds from the soil, turn over the soil, loosen the soil, reach covered areas and spread materials efficiently, all require a variety of different tools with a low level of efficiency, making the process cumbersome, ineffective and time consuming.

Existing material spreaders may be inconvenient to use. For Example, WO2018229792A2 provides an apparatus with a delivery pipe for dispensing at least one of a granular material or a powder material from a storage tank, the delivery pipe comprising a delivery pipe having a first end coupled to an outlet of the storage tank and a second end coupled to an end ejector, wherein the end ejector facilitates the required discharge of the granular material or the powder material therefrom; an elongate mount provided in the interior of the delivery pipe, wherein a plurality of buckets are mounted on the elongate mount; and displacing means coupled with the elongate mount for facilitating linear reciprocating motion of the elongate mount and the plurality of buckets within the delivery pipe.

Another example illustrating the existing solutions is U.S. Pat. No. 7,065,944B1, which is an attachment for a leaf blower with a conduit and a container holding a reservoir of particulate matter in communication with the conduit. The device incorporates a control mechanism for regulating the gravity-fed dispensing of particulate matter into a pressurized air stream. Additionally, it includes a shoulder strap with a flexible conduit extending from it, allowing the device to be attached to the conduit for metering the container's contents into an air stream. Both attachments can be utilized for various applications, such as spreading seeds, dusting gardens, sowing seeds for deer food plots, dusting fruit trees and orchards, fogging under houses, fertilizing yards, controlling poison ivy, managing insect infestations.

In view of the above, there is a need for a system and method that may overcome the shortcomings presented above.

SUMMARY

The present invention relates to methods or apparatuses for dispensing air stream or material with air stream onto a surface. A gardening apparatus may include a container assembly configured to contain a variable supply of material, an air blowing assembly powered by a battery configured to generate an adjustable air flow, an activation controller with settings to adjust an air flow intensity, a dispensing conduit forming flow communication between an exit valve of the container assembly, the air blowing assembly and at least one dispensing outlet in a distal end of the dispensing conduit. The air blowing assembly is fixed on a proximal end of the dispensing conduit and configured to blow air into said dispensing conduit. The exit valve is connected into the dispensing conduit at a location between the proximal end and the distal end of the dispensing conduit. The activation controller is configured to activate the dispensing apparatus in at least two modes of operation and switch between them: a first mode of operation wherein the exit valve is closed, such that air stream from air blowing assembly is pushed out from said dispensing conduit through the dispensing outlet, and a second mode of operation wherein the exit valve in the container assembly is open, such that material contained in said container assembly is released into said dispensing conduit and pushed by air stream out from said dispensing conduit through said at least one dispensing outlet.

Any one or more of the following features, designs and configurations can be incorporated in the invention detailed herein, independently or in combination therewith:

In another embodiment of the present invention, the gardening apparatus may include a dispensing conduit whose length is adjustable to change distance of the at least one dispensing outlet from the activation controller.

According to another embodiment, the gardening apparatus may include at least one dispensing outlet whose configuration is adjustable to change direction, pattern or range of release of air stream or material with air stream from the dispensing conduit.

In another embodiment, the gardening apparatus may include at least one dispensing outlet comprising an adjustable nozzle to change distribution pattern of air stream or material with air stream from said dispensing conduit.

In accordance with another embodiment, the gardening apparatus may include at least one dispensing outlet having a sharpened edge configured for breaking up, loosening and turning over soil and for releasing air stream or material with air stream from said dispensing conduit into the soil or surface.

In another embodiment, the gardening apparatus may include two or more dispensing outlets.

In another embodiment, the two or more dispensing outlets may be configured in a fork shape.

In another embodiment, the gardening apparatus may include an additional mode of operation configured to alternately switch between a first mode of operation and a second mode of operation in at least one preset automated cycle duration, such that at least one dispensing outlet alternately releases air stream and material with air stream.

In another embodiment, the gardening apparatus may include two or more selectable preset automated cycle durations.

In another embodiment, the gardening apparatus may include an exit valve whose aperture size is adjustable for controlling rate of release of material from said container assembly into said dispensing conduit.

In another embodiment, the amount of intensity of air stream entering said dispensing conduit adjustable.

In another embodiment, the gardening apparatus may include an additional container assembly configured to contain a variable supply of additional material, wherein the additional container assembly is in flow communication with a dispensing conduit through an additional exit valve, and wherein the dispensing apparatus may be activated by an activation controller in at least two additional modes of operation: a first additional mode of operation wherein an additional exit valve is closed while first exit valve is open, blocking passage of additional material into the dispensing conduit and a second additional mode of operation wherein the additional exit valve is open while the first exit valve is open, such that material contained in the container assembly and additional material contained in the additional container assembly are simultaneously released into said dispensing conduit, mixed together and pushed by air stream out from the dispensing conduit through at least one dispensing outlet.

In another embodiment, the gardening apparatus may include a third additional mode of operation wherein an additional exit valve is open while the first exit valve is closed, such that additional material contained in the additional container assembly is released into a dispensing conduit and pushed by air stream out from the dispensing conduit through at least one dispensing outlet.

In another embodiment, the gardening apparatus may include a fork mounted on the distal end of the dispensing conduit for breaking up, loosening and turning over soil.

In another embodiment, the gardening apparatus may include a carrying handle extending from the dispensing apparatus adjacent to proximal end of the dispensing apparatus.

In another embodiment, the dispensing apparatus may include an activation controller positioned on the carrying handle.

In another embodiment, the dispensing apparatus may include a secondary carrying handle extending from the dispensing apparatus in a position different than the position from which the carrying handle extends from.

In another embodiment, the dispensing outlet of the dispensing apparatus may include a splitting element for distributing the air stream or material with air stream released from the dispensing outlet to two or more directions.

For example, the container assembly in the dispensing apparatus may include an agitator installed in proximity to the exit valve configured to facilitate passage of material contained in the container assembly through the exit valve.

In another embodiment, the container assembly may be detachable. When configured as a detachable container assembly, the container assembly may be replaceable, allowing a user to remove an empty container assembly and attach a full container assembly instead. The detachable container assembly may be fillable by a user, or alternatively, it may be a pre-filled disposable container assembly purchased separately.

According to another embodiment of the present disclosure, a method for dispensing air stream or material with air stream onto a surface is provided, the method include using a gardening apparatus comprising a container assembly configured to contain a variable supply of material, an air blowing assembly powered by a battery configured to generate an adjustable air flow, an activation controller with settings to adjust an air flow intensity, a dispensing conduit forming flow communication between an exit valve of the container assembly, the air blowing assembly and at least one dispensing outlet in a distal end of the dispensing conduit, wherein the air blowing assembly is fixed on a proximal end of the dispensing conduit and configured to blow air into the dispensing conduit, the exit valve is connected into the dispensing conduit at a location between the proximal end and the distal end of the dispensing conduit, and the activation controller is configured to activate the gardening apparatus in at least two modes of operation and switch between them: a first mode of operation wherein the exit valve is closed, such that air stream from air blowing assembly is pushed out from the dispensing conduit through the dispensing outlet and a second mode of operation wherein the exit valve is open, such that material contained in the container assembly is released into the dispensing conduit and pushed by air stream out from the dispensing conduit through the dispensing outlet. The method further includes activating said dispensing apparatus in at least one of said two modes of operation over a designated surface.

Other embodiments of this disclosure may be related to a gardening apparatus comprising a container assembly configured to contain a variable supply of material, an air blowing assembly powered by a battery, an activation controller, a first dispensing conduit forming flow communication between an exit valve of the container assembly, the air blowing assembly and at least one dispensing outlet in a distal end of the first dispensing conduit, and a second dispensing conduit forming flow communication between the air blowing assembly and at least one dispensing outlet in a distal end of the second dispensing conduit. The air blowing assembly is fixed on a proximal end of the first dispensing conduit and configured to blow air into the first dispensing conduit. The exit valve is connected into the first dispensing conduit at a location between the proximal end and the distal end of the first dispensing conduit. The air blowing assembly is also configured to blow air into the second dispensing conduit to be released out through at least one dispensing outlet of the second dispensing conduit. The dispensing outlet of the first dispensing conduit is directed to a first surface area and the dispensing outlet of the second dispensing conduit is directed to a second surface area, wherein direction of movement of the dispensing apparatus during activation is from the second surface area to the first surface area, such that the same surface area initially receives an air stream from the dispensing outlet of the second dispensing conduit and then receives a material with air stream from the dispensing outlet of the first dispensing conduit.

Other embodiments of this disclosure may be related to dispensing Control: This innovative gardening tool offers precise control over the amount of material dispensed. The key element is the exit valve. By adjusting the opening of this valve, users can regulate the flow of material from the container. A fully open valve allows for the maximum release of material, while a completely closed valve prevents any material from exiting. This allows gardeners to tailor the application to their specific needs, whether they require a concentrated dose or a light dusting.

Other embodiments of this disclosure may be related to distance control: Independent of the amount dispensed, the distance the material travels is governed by the strength of the air blowing assembly. This component generates an adjustable air flow that propels the material from the dispensing outlet. Selecting a higher air flow intensity will push the material further, while a lower intensity will result in a shorter travel distance. This functionality empowers users to target specific areas within their garden with pinpoint accuracy, regardless of the application amount.

Other embodiments of this disclosure may be related to a specific feature related to the container assembly (108). specifies that the container assembly is sealed and airtight, preventing air from entering or exiting except through the controlled air flow generated by the air blowing assembly (104) and the dispensing conduit (107). In the operation, the air blowing assembly can pressurize the container, creating a stronger and more forceful air stream exiting the dispensing outlet.

Thos sealed container adds a crucial advantage: it prevents uncontrolled airflow into the container. This is particularly important in situations where the material being dispensed could be easily blown back into the container through the dispensing conduit or exit valve, potentially causing a mess or interfering with the operation. The device specifically mention in U.S. Pat. No. 7,065,944 B1 is an example of a prior art device that may experience this issue. In such devices, the material could potentially be blown back into the container through the inlet opening, causing inefficiencies or even hazards. This pressurization allows for a stronger and more concentrated air flow when using the first mode (blowing air only). This could be beneficial for tasks like clearing debris, blowing away light dust, or even for more focused applications.

All embodiments based on the basic embodiment of the gardening apparatus that comprise a single dispensing conduit are hereby incorporated by reference mutatis mutandis in respect to the embodiment presented herein with two dispensing conduits.

Various objects, features, and aspects of the present invention will become more apparent from the following detailed description of preferred embodiments of the invention, along with the accompanying drawings in which like numerals represent like components.

BRIEF DESCRIPTION OF THE DRAWING

In order to better understand the subject matter that is disclosed herein and to exemplify how it may be carried out in practice, embodiments will now be described, by way of non-limiting example only, with reference to the accompanying drawings, in which:

FIG. 1*a* is an illustration of an isometric view of a dispensing apparatus according to some embodiments.

FIG. 1*b* is a side view of the dispensing apparatus shown in FIG. 1*a*.

FIG. 2 is an illustration of a method of using a dispensing apparatus according to some embodiments of the present invention.

FIG. 3 is an illustration of another method of using a dispensing apparatus according to some embodiments of the present invention.

FIG. 4 is an illustration of a dispensing apparatus with an adjustable dispensing outlet according to some embodiments.

FIG. 5*a* is an illustration of a dispensing apparatus with two dispensing outlets according to some demonstrative embodiments.

FIG. 5*b* illustrates a method of using the dispensing apparatus shown in FIG. 5*a* in accordance with embodiments of the present invention.

FIG. 5*c* is an illustration of the dispensing outlets of the dispensing apparatus shown in FIG. 5*c* from a top view.

FIG. 6*a* is an illustration of a dispensing apparatus with a fork mounted in front of the dispensing outlets according to embodiments of the present invention.

FIG. 6*b* illustrates a method of using the dispensing apparatus shown in FIG. 6*a* in accordance with embodiments of the present invention.

FIG. 7 is an illustration of a dispensing apparatus with a frontal carrying handle according to some demonstrative embodiments.

FIG. 8*a* is an illustration of a dispensing apparatus with an agitator according to some demonstrative embodiments.

FIG. 8*b* illustrates circular motion of the agitator shown in FIG. 8*a*.

FIG. 9*a* is an illustration of a dispensing apparatus with a splitting element mounted on the dispensing outlet according to some demonstrative embodiments.

FIG. 9*b* illustrates the exit pattern of material released through the dispensing outlet with splitting element shown in FIG. 9*a*.

FIG. 10*a* is an illustration of a dispensing apparatus with two dispensing conduits according to some demonstrative embodiments. FIG. 10*b* illustrates release of air stream and material with air stream through the dispensing outlets of the dispensing apparatus shown in FIG. 10*a*.

FIG. 11*a* is an illustration of a dispensing apparatus with two container assemblies according to some demonstrative embodiments.

FIG. 11*b* illustrates release of materials from the dispensing apparatus shown in FIG. 11*a*.

FIG. 12*a* is an illustration of a dispensing apparatus with an extended fork shaped dispensing outlet according to some demonstrative embodiments.

FIG. 12*b* illustrates release of materials from the dispensing apparatus shown in FIG. 12*a*.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise.

As shown throughout the figures, the present disclosure refers to gardening and/or dispensing devices. More specifically, the present disclosure refers also to portable gardening and/or dispensing devices for spreading materials or unassorted objects. Additionally, the present disclosure refers also to wind blowing devices, and in particular, wind blowing devices combined with dispensing devices.

In some embodiments, the device of the present disclosure is intended to distribute gardening material, fertilizer, pesticide, weed-killing chemical, rodent and snake repellent and/or other granular, particulate or liquid materials, onto vegetation, soil, or the like. A user of the apparatus maintains a standing posture.

Reference is first made to FIGS. 1a and 1b, illustrating a dispensing apparatus in accordance with one demonstrative embodiment, from an isometric view and cross-section view, respectively. As shown, the gardening apparatus 100 may include a container assembly 108 configured to contain a variable supply of material, an air blowing assembly 104 powered by a battery 105 configured to generate an adjustable air flow, an activation controller 102 with settings to adjust an air flow intensity, a dispensing conduit 107 forming flow communication between an exit valve 120 in the bottom of the container assembly 108, the air blowing assembly 104 and a dispensing outlet 106 in a distal end of the dispensing conduit 107. FIG. 1b shows a cross section of the gardening apparatus 100, including a container assembly 108 configured to contain a variable supply of material, an air blowing assembly 104 powered by a battery 105, an activation controller 102, a dispensing conduit 107 forming flow communication between an exit valve 120 in the bottom of the container assembly 108, the air blowing assembly 104 and a dispensing outlet 106 in a distal end of the dispensing conduit 107.

The device is configured to be held by a user in standing position through the carrying handle 101. The carrying handle 101 includes an activation controller 102 configured in this embodiment as a switch. This is only one possible embodiment of an activation controller, and the activation controller in the present disclosure should be interpreted to include also buttons, remote controls, voice commands, and any other type of activation means known in the art. The activation controller may include more than one activation element in some embodiments that include various operation functions of the gardening device.

The air blowing assembly 104 may be fixed on a proximal end of the dispensing conduit 107 and configured to blow continuous air stream into the dispensing conduit when activated. The mechanism that generates air stream in the air blowing assembly 104 may be a rotating fan or rotor or any other air stream generating mechanism known from the prior art. The air blowing assembly may be powered by a battery 105 or any other power source known from the prior art.

The container assembly 108 may be fixed above the dispensing conduit 107 and the exit valve 110 in the bottom of the container assembly 108 may form flow communication between the container assembly 108 dispensing conduit 107 at a location between proximal end and distal end of the dispensing conduit 107. The container assembly 108 may be partially or fully open from its top, or alternatively, may be close from all sides and contain a closeable aperture for filling it with dispensable material.

The dispensing outlet 106 may be configured as a single aperture in the distal end of the dispensing conduit 107 through which air stream or material with air stream pushed through the dispensing conduit 107 may be released from the gardening apparatus 100. The gardening apparatus 100 may have single or multiple dispensing outlets which may be configured in various shapes and have adjustable positions.

The activation controller 102 may be configured to activate the dispensing apparatus 100 in at least two modes of operation and switch between them: in a first mode of operation, the exit valve 110 is closed, thereby preventing the passage of material from the container assembly 108 into the dispensing conduit 107. This way, the air stream exiting the air blowing assembly 104 is pushed through the dispensing conduit 107 without being interrupted or mixed with any material, and released through the dispensing outlet 106. In a second mode of operation, the exit valve 110 may be open, such that material contained in the container assembly 108 may fall into the dispensing conduit 107, and be pushed by air stream exiting the air blowing assembly 104 through the dispensing conduit 107 and out through the dispensing outlet 106.

Referring now to FIG. 2 illustrates a method of using a dispensing apparatus according to some embodiments of the present discloser. In first stage 201, an activation controller is pressed to activate the dispensing apparatus in a mode of operation. In the second stage 202, the device is activated in accordance with the mode of operation set by the activation controller. According to the mode of operation shown in this illustration, the exit valve is open to allow material contained in the container assembly to fall into the dispensing conduit while the air blowing assembly is activated to blow air stream into the dispensing conduit. In the third stage 203, air stream blown into the dispensing conduit from the air blowing assembly is mixed with material released into the dispensing conduit from the container assembly and pushes the material through the dispensing conduit. In the fourth stage 204, the material with air stream pushed through the dispensing conduit is released from the dispensing apparatus through the dispensing outlet.

Reference is now made to FIG. 3, which illustrates another method of using a dispensing apparatus according to some embodiments of the present discloser. In the first stage 301, the activation controller is pressed to activate the dispensing apparatus in a first mode of operation. In the second stage 302, the device is activated in accordance with the first mode of operation set by the activation controller. According to the mode of operation shown in this illustration, the exit valve is close to prevent material contained in the container assembly from falling into the dispensing conduit while the air blowing assembly is activated to blow air stream into the dispensing conduit. In the third stage 303, air stream blown from the air blowing assembly into the dispensing conduit is released from the dispensing apparatus through the dispensing outlet and used for removing plant litter from an area on the ground.

In the fourth stage 304, the activation controller is pressed once again to activate the dispensing apparatus in a second mode of operation set by the activation controller. In the fifth stage 305, according to the mode of operation shown in this illustration, the exit valve is open to allow material contained in the container assembly to fall into the dispensing conduit while the air blowing assembly is activated to blow air stream into the dispensing conduit. In the sixth stage 306, air stream blown into the dispensing conduit from the air blowing assembly is mixed with material released into the dispensing conduit from the container assembly and pushes the material through the dispensing conduit. In the seventh stage 307, the material with air stream pushed through the dispensing conduit is released from the dispensing apparatus through the dispensing outlet and spread on an area on the ground.

Referring now to FIG. 4, showing a dispensing apparatus comprising an adjustable dispensing conduit for setting the distance of the dispensing outlet from the user that operates the device in accordance with embodiments of the present discloser. The dispensing conduit is formed of three telescopic segments, a base segment 406a (show in part), a middle segment 406b and a last segment 406c. The base segment 406a is installed in the dispensing device in a fixed position, whereas middle segment 406b may retract into and extend out from base segment 406a, and last segment 406c may retract into and extend out from middle segment 406b. The retraction and extension of the three segments of the dispensing conduit adjust the distance of the dispensing outlet 407 from the body of the device and user operating the device.

FIG. 5a is an illustration of a dispensing apparatus with two dispensing outlets according to some demonstrative embodiments. The distal end of the dispensing conduit comprises a first dispensing outlet 507a and a second dispensing outlet 507b. The dispensing outlets 507a and 507b are configured in a fork shape, slightly spaced apart from one another and extending diagonally to a plane lower than the plane of the dispensing conduit.

FIG. 5c is an illustration of a top view of the dispensing outlets of the dispensing apparatus shown in FIG. 5a.

Figure 6A:
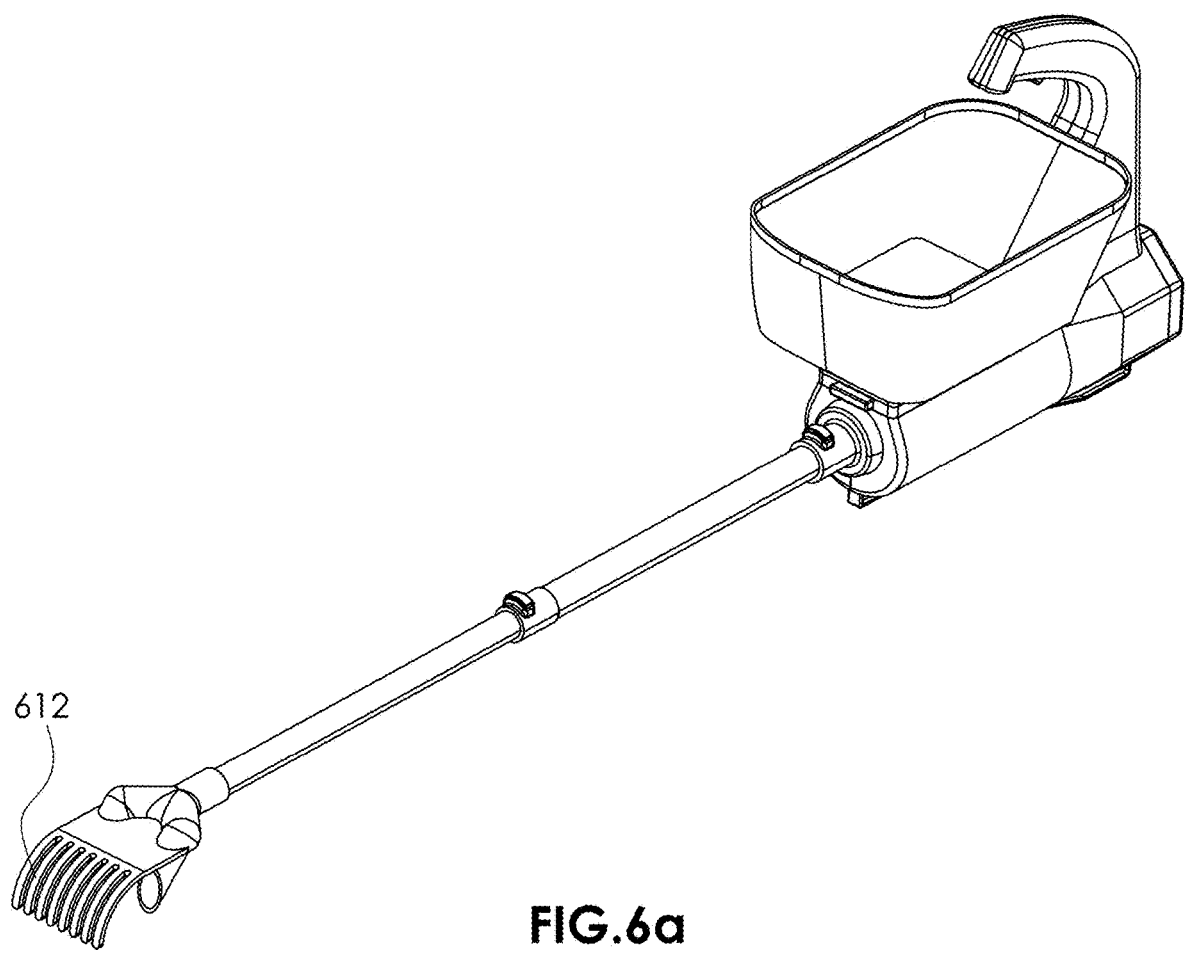
FIG. 6a is an illustration of a dispensing apparatus with a fork mounted in front of the dispensing outlets according to some embodiments of the present disclosure. In this illustration, a fork 612 comprising multiple downward-curved prongs is mounted at the distal end of the dispensing conduit, in front of the dispensing outlets.
Figure 6B:
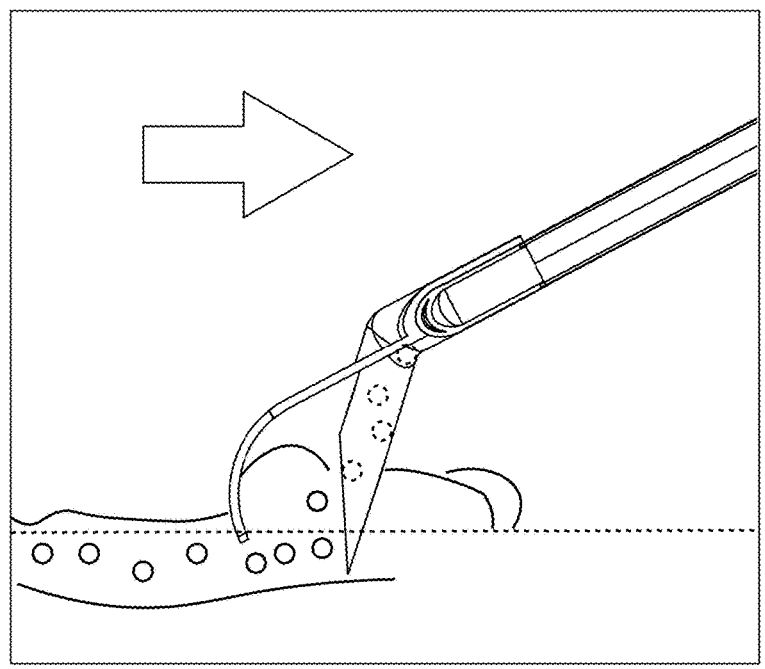

FIG. 6b illustrates a method of using the dispensing apparatus shown in FIG. 6a, wherein the dispensing outlets and the fork are partially inserted into the soil during operation of the dispensing apparatus, and the dispensing apparatus is pulled such that the dispensing outlets and the fork plough the soil while the dispensing outlets release material contained in the dispensing apparatus into the soil.

Figure 7:
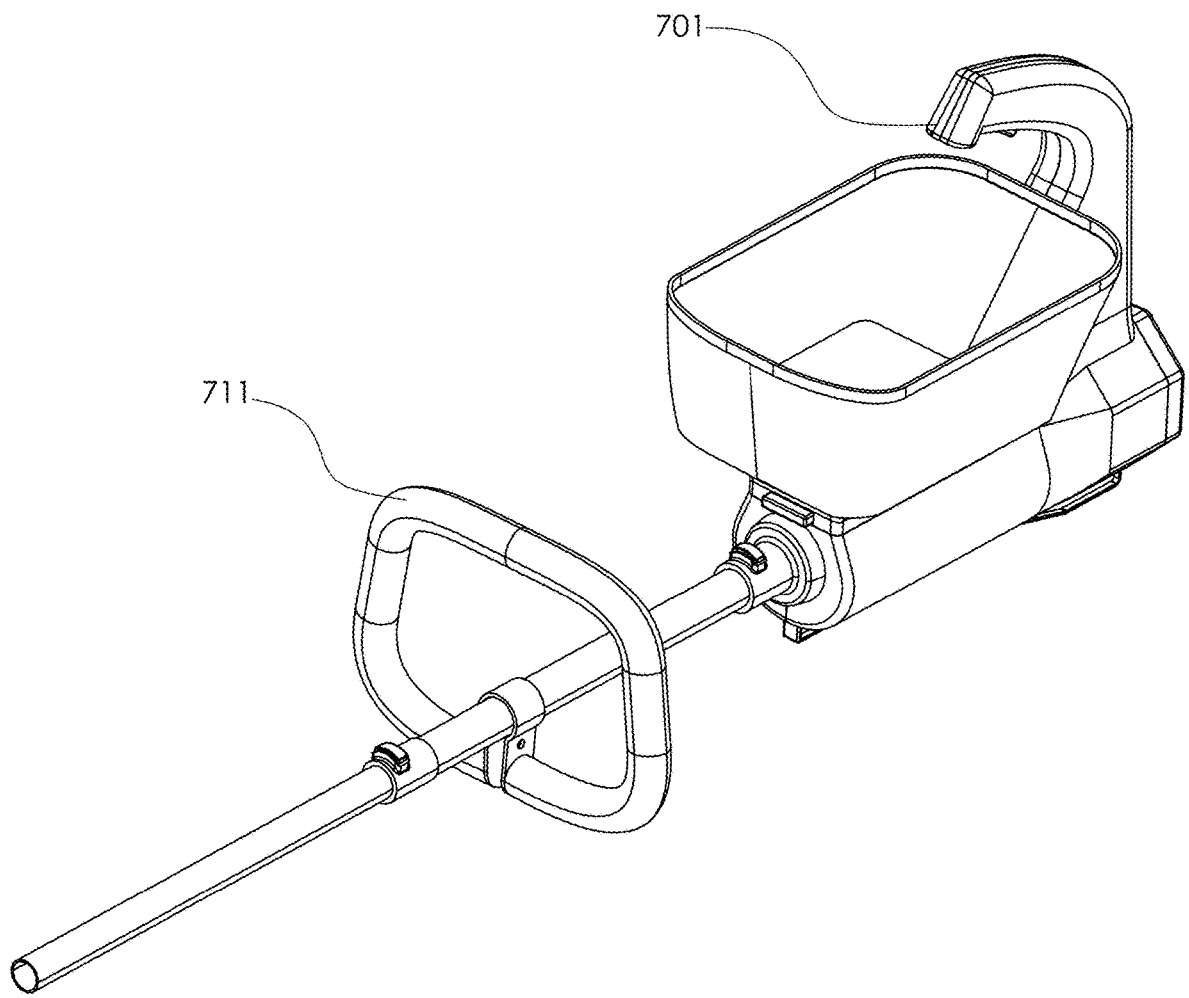

FIG. 7 is an illustration of a dispensing in accordance with an embodiment of the present disclosure, comprising a secondary frontal carrying handle 711 in addition to the primary rear carrying handle 701, allowing a user of the dispensing apparatus to hold it with both hands.

Figure 8A:
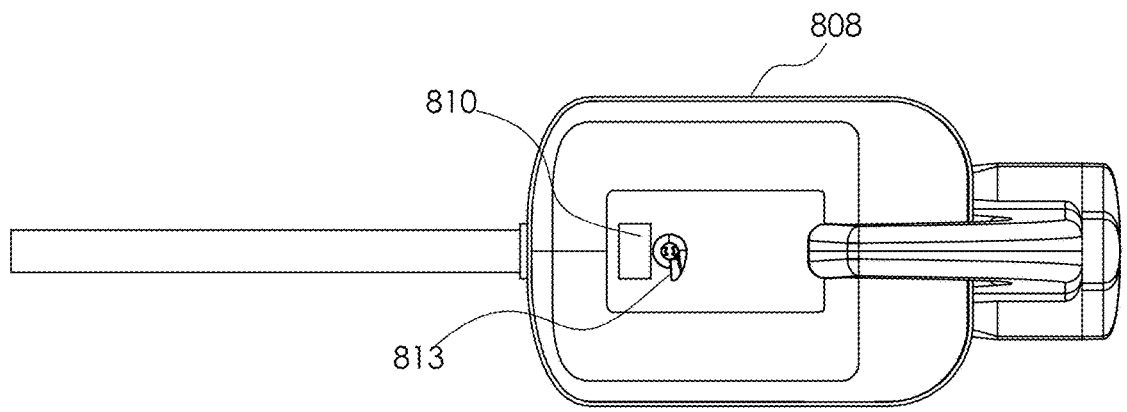

FIG. 8a is an illustration of a dispensing apparatus with an agitator 813 according to some demonstrative embodiments. The agitator 813 is rotatably installed adjacently to an exit valve 810 at the bottom of a container assembly 808. The agitator 813 may be actuated by a motor that causes it to rotate.

Figure 8B:
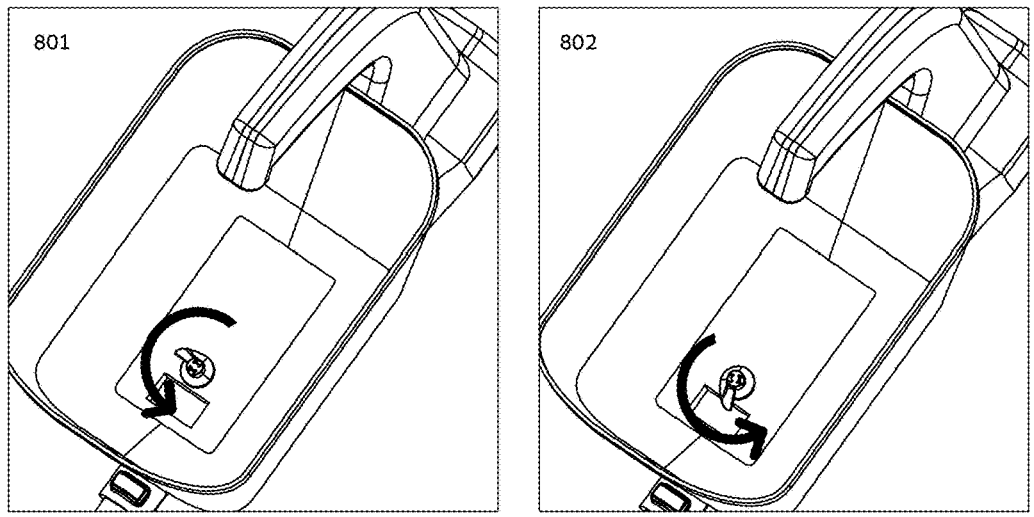
Figure 8B:
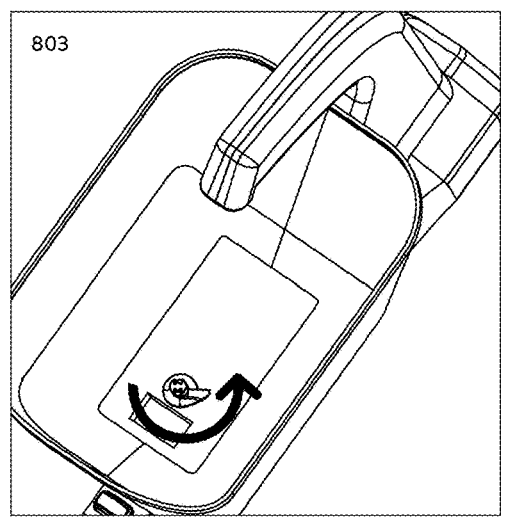

FIG. 8b illustrates circular motion of the agitator 813 shown in FIG. 8a. When the dispensing apparatus is activated in a mode wherein the exit valve 810 is open and material contained in the container assembly 808 may fall into the dispensing conduit, rotation of the agitator may cause the material to move toward the exit valve and disintegrate, thereby facilitating its passage into the dispensing conduit. The agitator 813 may be configured as a single or multi-bladed rotor, a helical or spiral shaft, a push-pull element, or any other type of agitator known in the art.

Figure 9A:
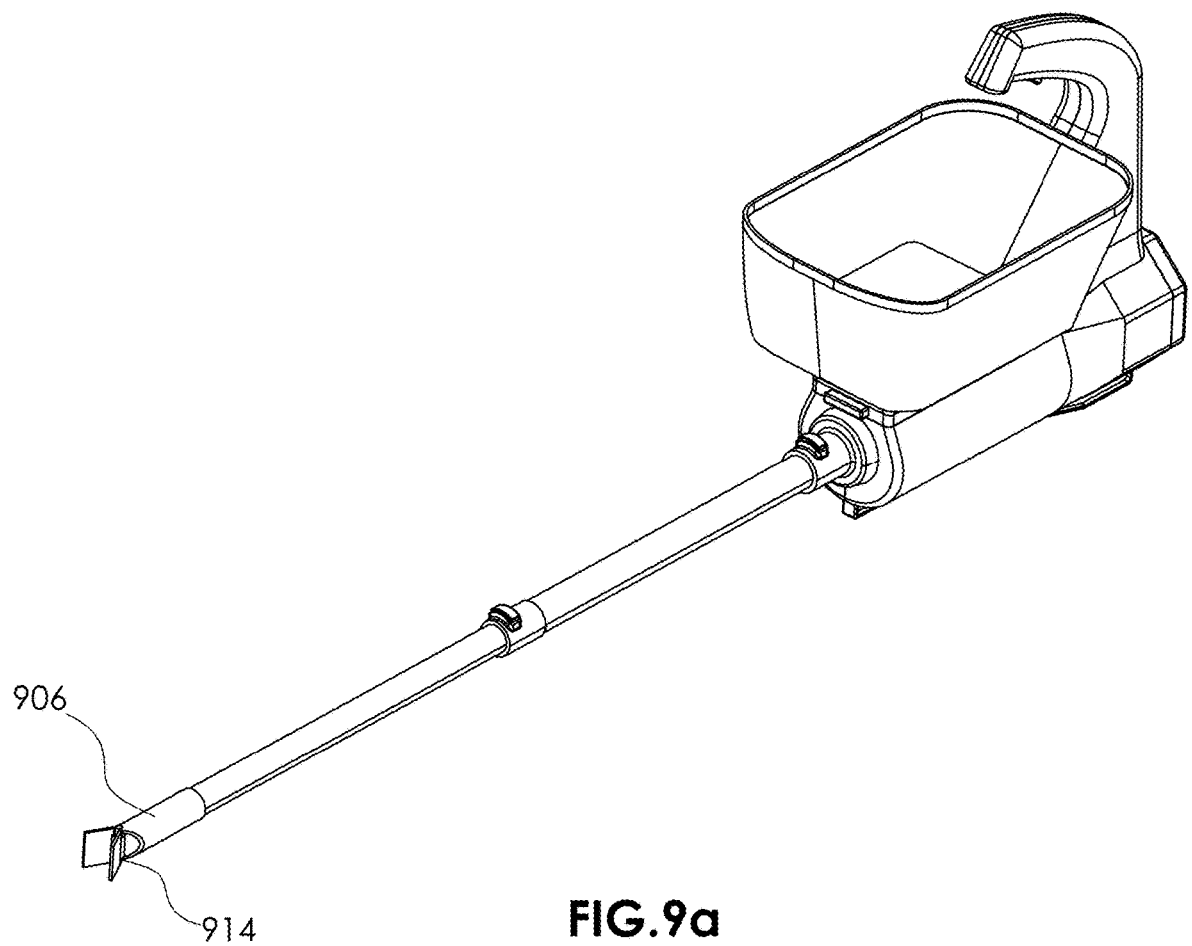

FIG. 9a is an illustration of a dispensing apparatus in accordance with an embodiment of the present disclosure, comprising a splitting element 914 mounted on the edge of a dispensing outlet 906.

Figure 9B:
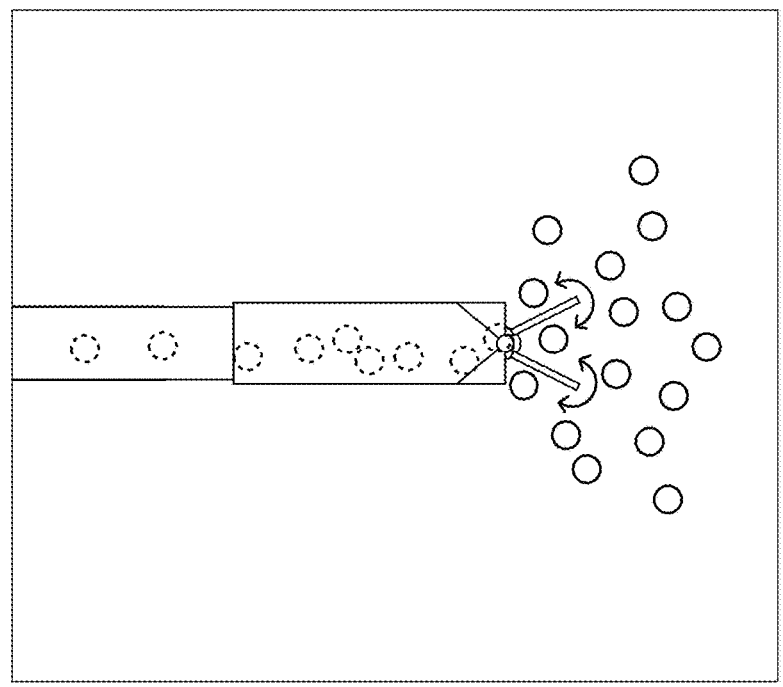

FIG. 9b illustrates the distribution pattern of material released through the dispensing outlet with the splitting element 914 shown in FIG. 9a. The splitting element 914 may be fixed or replaceable and may have a variety of shapes and configurations for different distribution patterns. Furthermore, as shown in FIG. 9b, the splitting element 914 may stream deviating panels rotatably installed on the edge of the dispensing outlet 906, allowing them to adjust their angle to control the directions toward which material is distributed.

Figure 10A:
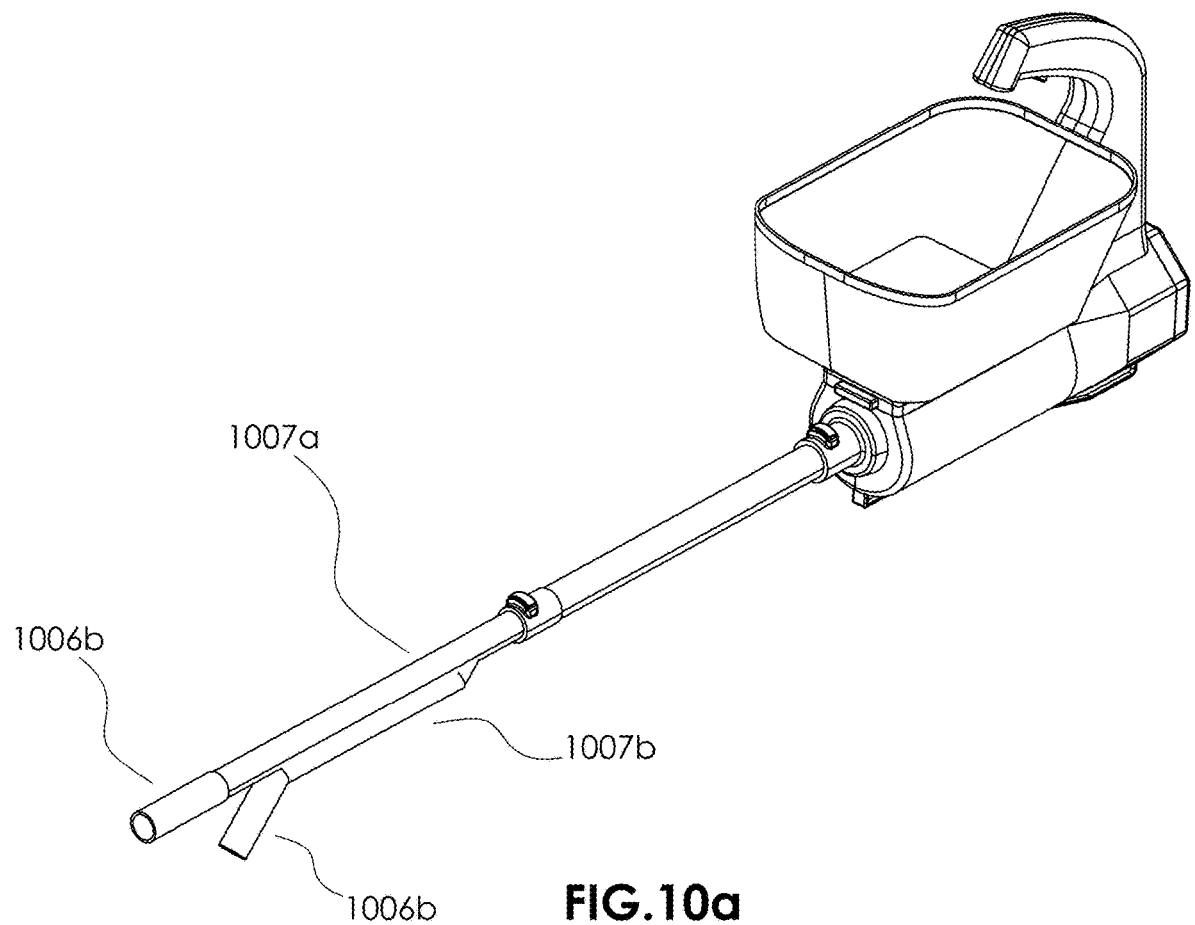

FIG. 10a is an illustration of a dispensing apparatus with two dispensing conduits according to some embodiments of the present invention. similarly to previous embodiments, the dispensing apparatus comprising a container assembly configured to contain a variable supply of material, an air blowing assembly powered by a battery and a carrying handle with an activation controller. In contrast to previous embodiments, the device in the present embodiment includes two separate dispensing conduits. A first dispensing conduit 1007a is configured similarly to the dispensing conduit in previous embodiments by forming flow communication between an exit valve of the container assembly, the air blowing assembly and a dispensing outlet 1006a in a distal end of the first dispensing conduit 1007a. A second dispensing conduit 1007b is configured differently by forming flow communication only between the air blowing assembly and a dispensing outlet 1006b in a distal end the second dispensing conduit 1007b.

The air blowing assembly is fixed on the proximal end of the first and second dispensing conduits and configured to blow air into both dispensing conduits. An exit valve in the bottom of the container assembly is connected into the first dispensing conduit 1007a at a location between the proximal end and distal end of said first dispensing conduit 1007a. The dispensing outlet 1006a of the first dispensing conduit 1007a is positioned farther from the body of the dispensing apparatus then the dispensing outlet 1006b of the second dispensing conduit 1007b and directed to an area farther than the area to which the dispensing outlet 1006b of the second dispensing conduit 1007b is directed.

When the user holding the dispensing apparatus advances forward while the device is activated, each area of surface they pass through initially receives an air stream released from the dispensing outlet of the first dispensing conduit, and immediately after receives material contained in the container assembly with air stream from the dispensing outlet of said second dispensing conduit.

Figure 10B:
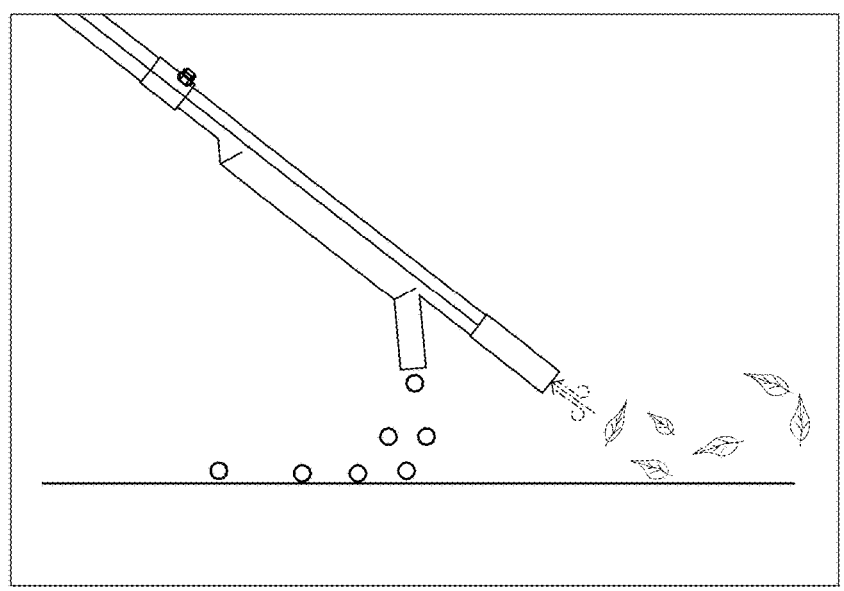

FIG. 10b illustrates release of air stream and material with air stream through the dispensing outlets of the dispensing apparatus shown in FIG. 10a. In this illustration, the air stream released from the dispensing outlet of the first dispensing conduit removes plant litter from an area of surface before material contained in the container assembly is spread over the same surface area. This way, clearing the surface from plant litter before spreading the material over it facilitates more effective usage of the material and better absorption of the material into the surface. All embodiments based on the basic embodiment of the dispensing apparatus that comprises a single dispensing conduit are hereby incorporated by reference mutatis mutandis in respect to the embodiment presented herein with two dispensing conduits.

Figure 11A:
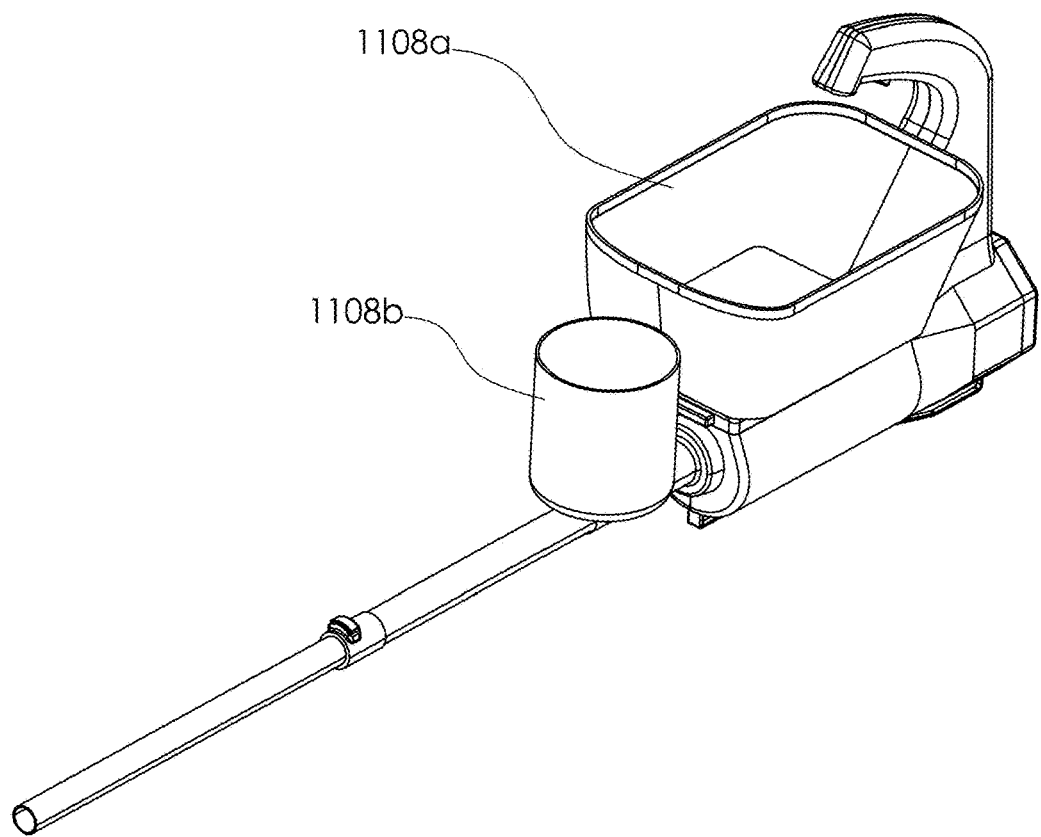

FIG. 11a is an illustration of a dispensing apparatus with a first container assembly 1108a and a second container assembly 1108b, according to an embodiment of the present disclosure. Each of the container assemblies may contain a variable supply of material and each is in flow communication with the dispensing conduit through an exit valve at the bottom of each container assembly. The device may be controlled by the activation controller to be activated in additional modes of operation beyond the modes of operation mentioned in previous embodiments. In a first additional mode of operation, the exit valve of first container assembly 1108a is closed while the exit valve of a second container 1108b assembly is open. In a second additional mode of operation, the exit valve of the first container assembly 1108a is open while the exit valve of the second container assembly 1108b is open, such that materials contained in both container assemblies are simultaneously released into the dispensing conduit, mixed together and pushed by air stream out from the dispensing conduit through the dispensing outlet.

Figure 11B:
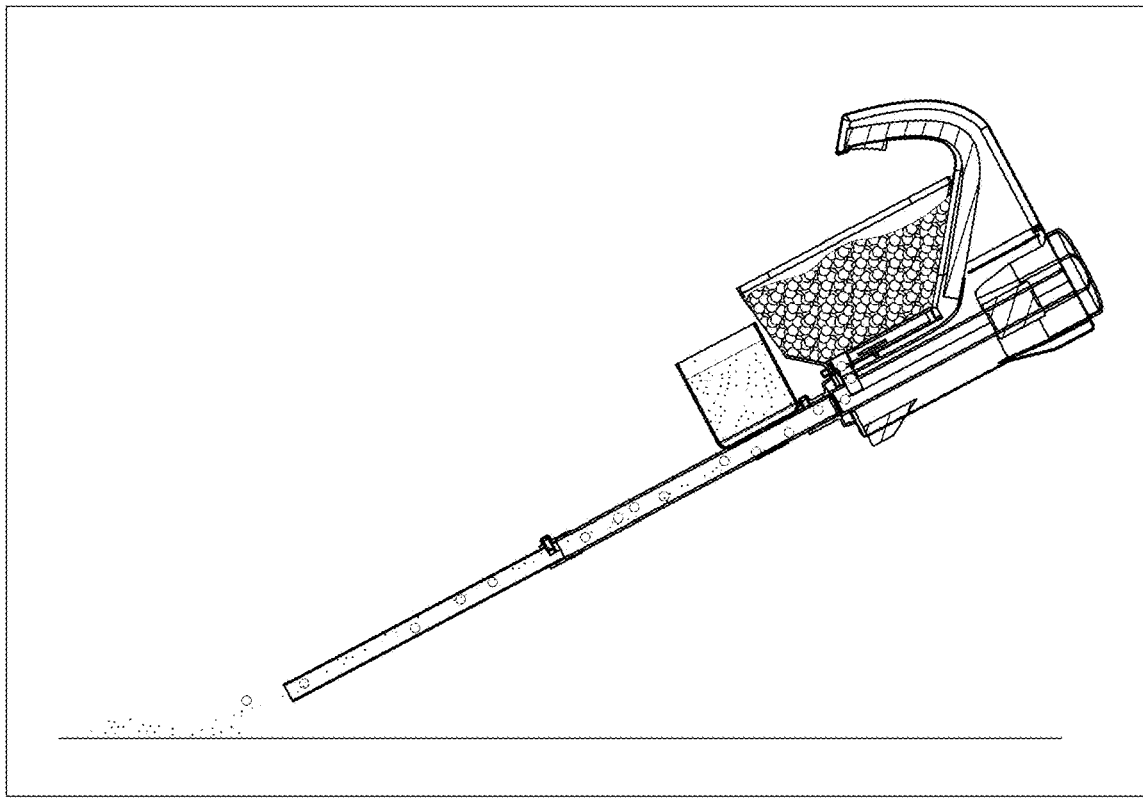

FIG. 11b illustrates a release of materials from both container assemblies of the device illustrated in FIG. 11a, in accordance with the second additional mode of operation mentioned above.

Figure 12A:
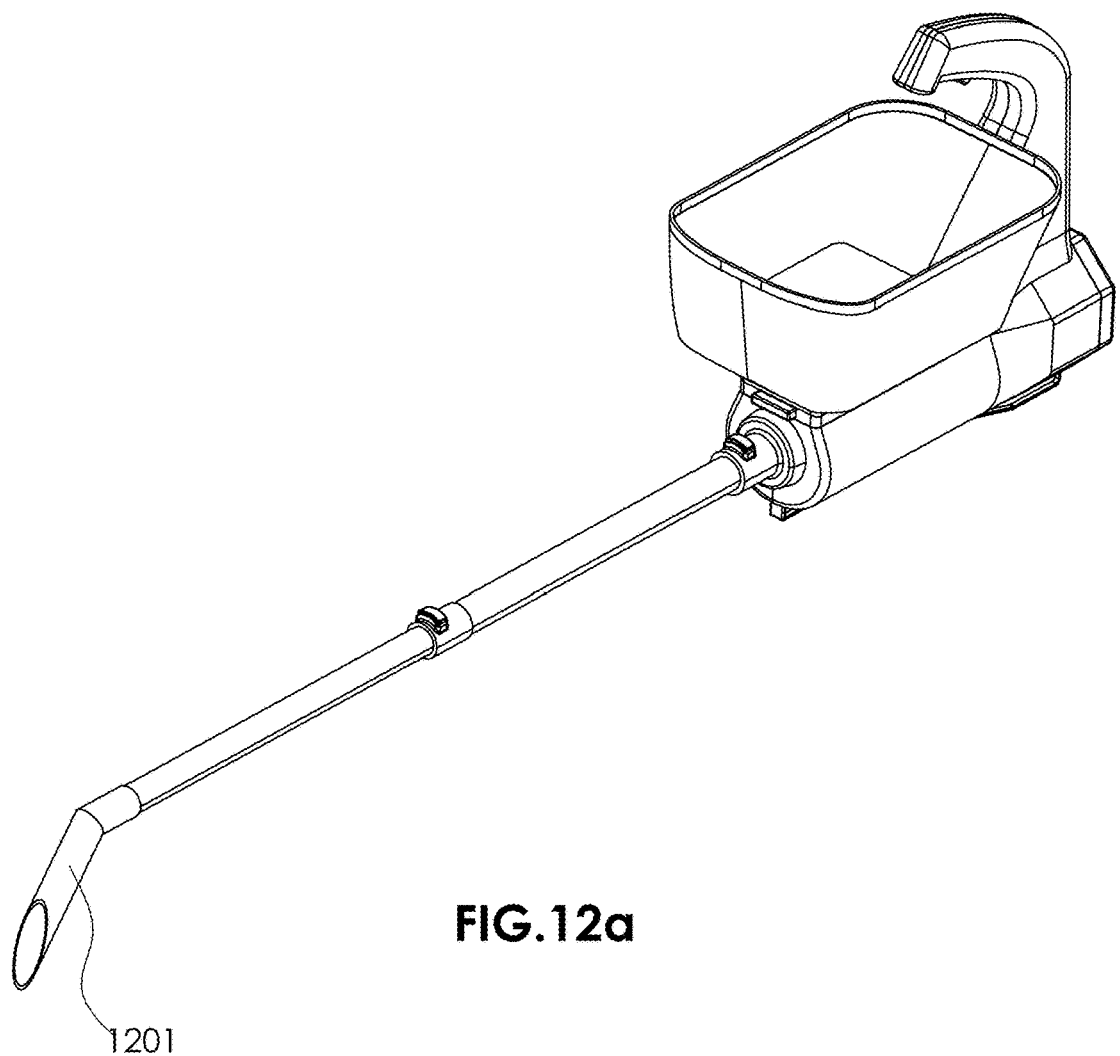

FIG. 12a illustrates a dispensing apparatus with a downward inclining a single-pronged fork-shaped dispensing outlet 1201 according to some demonstrative embodiments. The dispensing outlet 1201 has an extended length with a sharpened tip, and its opening is configured in a vertically elongated shape.

Figure 12B:
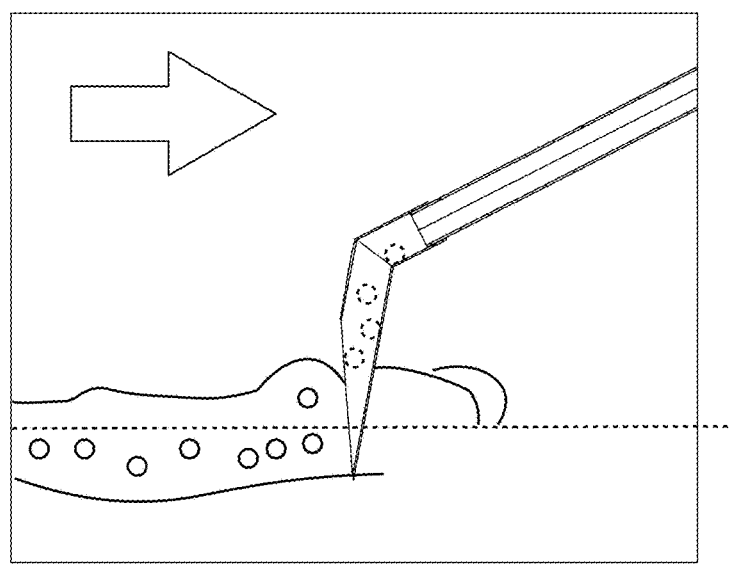

FIG. 12b illustrates the release of materials from the dispensing apparatus shown in FIG. 12a. The sharpened tip of the dispensing outlet 1201 plows the soil while the material is distributed from the dispensing apparatus, improving the efficiency of distribution of the material by partially distributing it under the surface. The elongated opening of the dispensing outlet 1201 causes it to be partially under the ground surface and partially above it while the dispensing outlet 1201 is inserted into and driven through the soil. This prevents the opening of the dispensing outlet 1201 from being clogged with soil and allows the dispensing apparatus to continue distributing material contained therein onto the soil even if the part of the opening of the dispensing outlet 1201 inserted into the soil is blocked.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

Figure 1A:
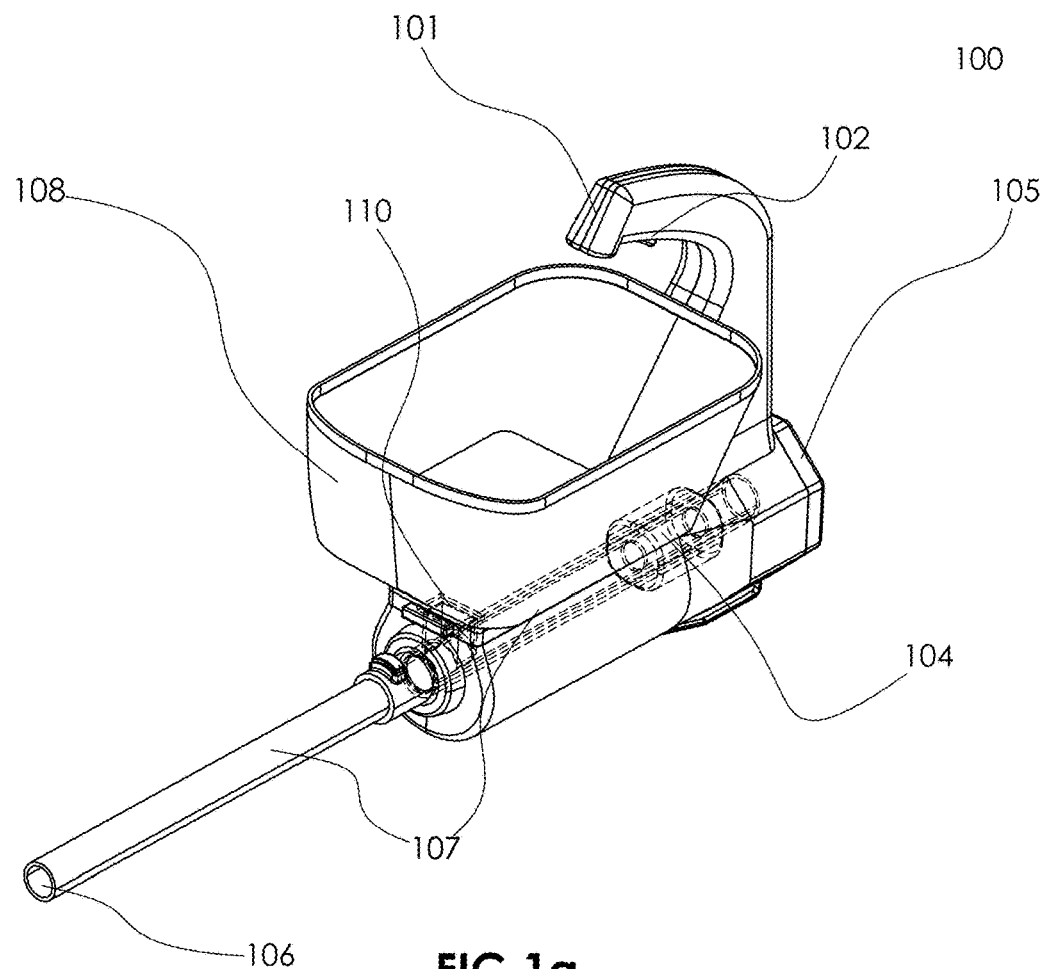
Figure 1B:
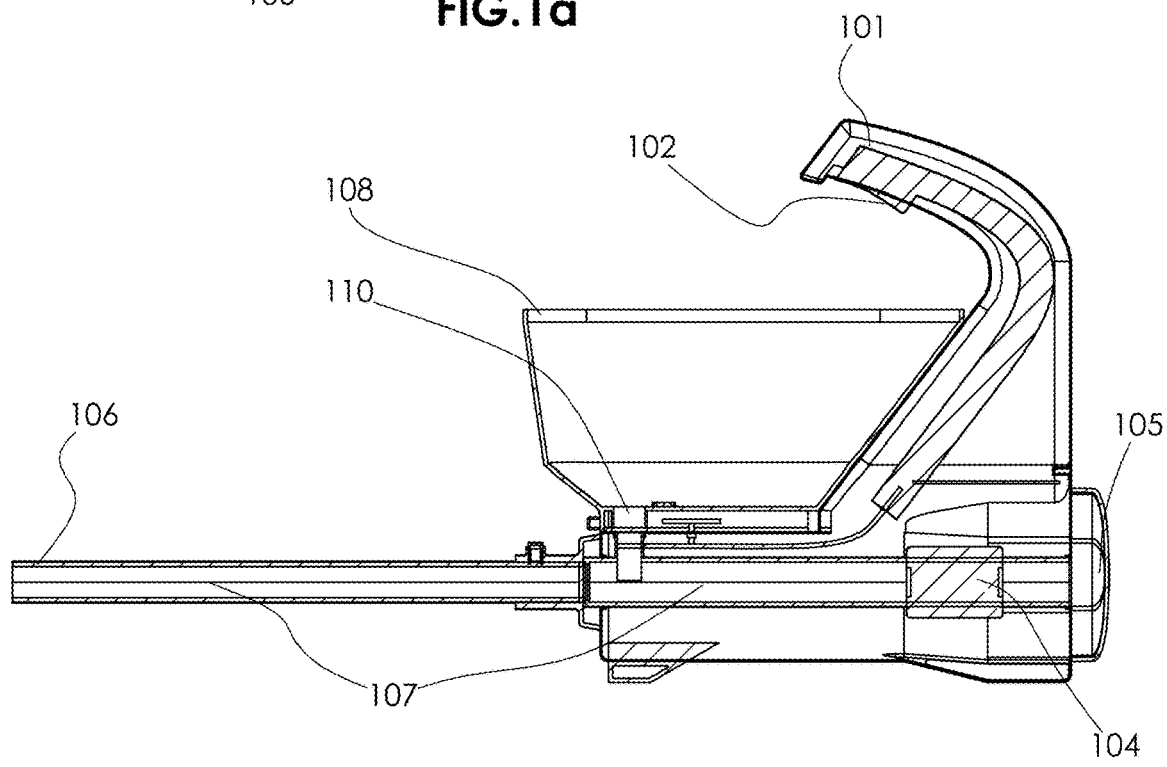
Figure 2:
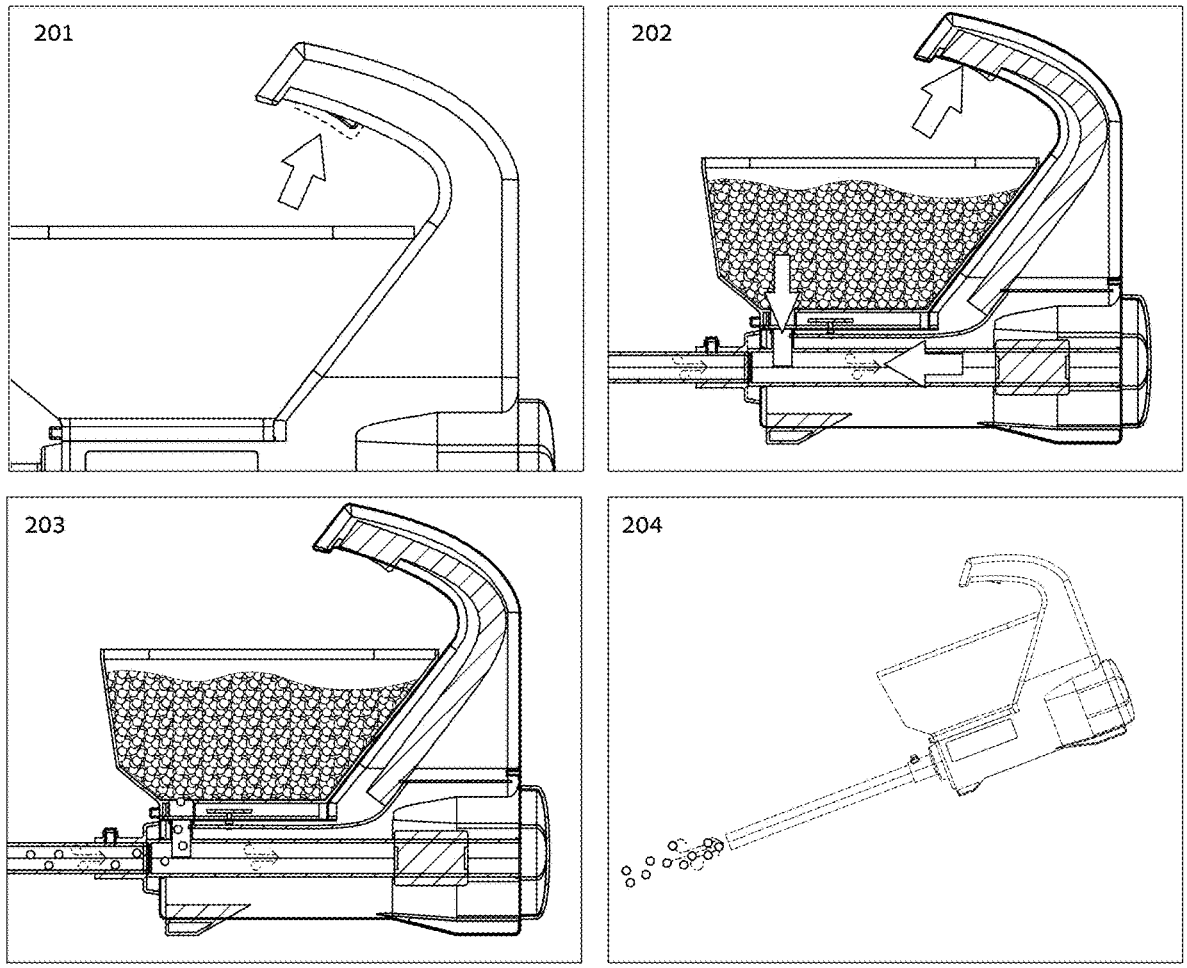
Figure 3:
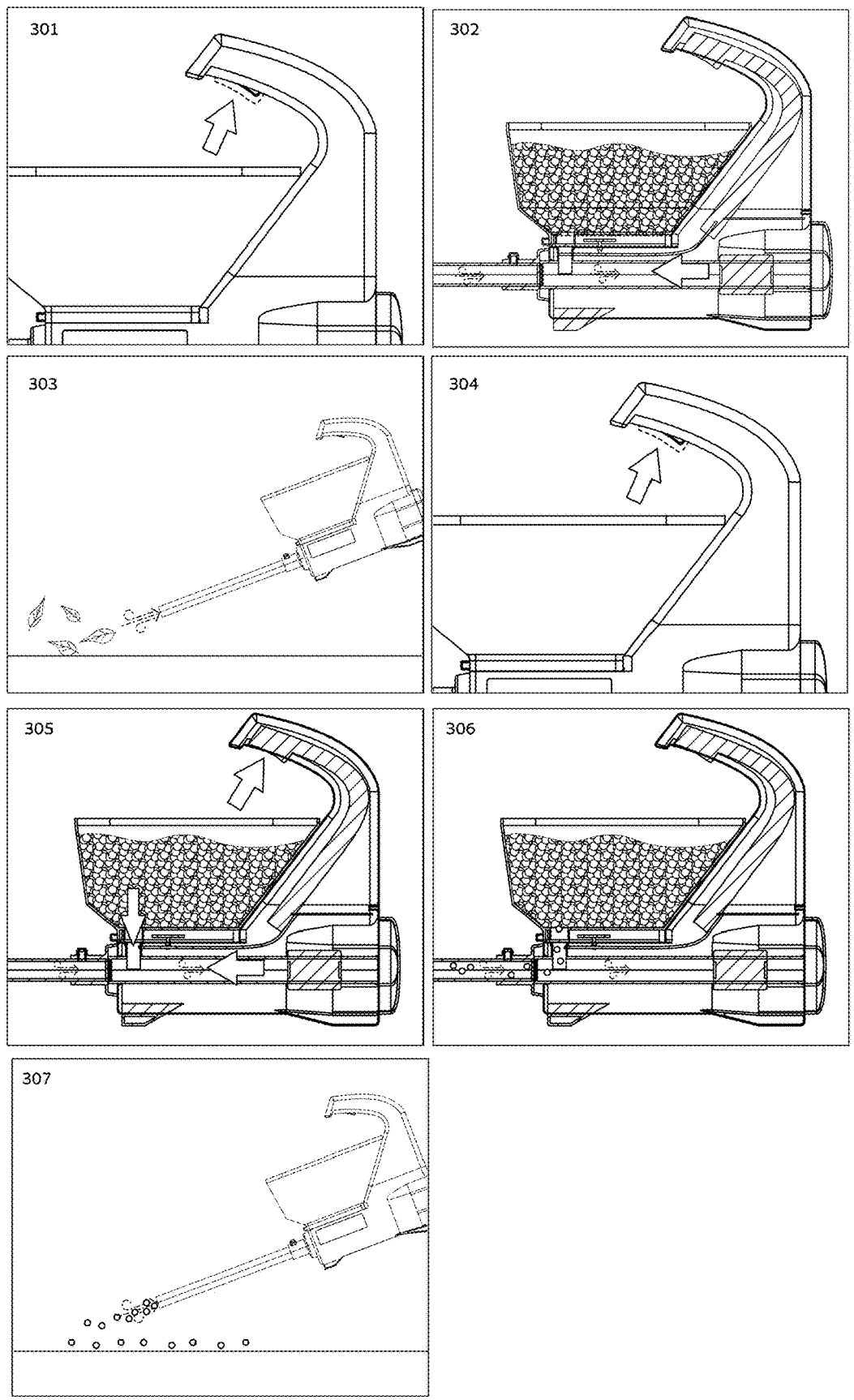

What is claimed is:

1. A portable hand-held gardening apparatus (FIG 1a), comprising:
    a container assembly (108) configured to contain a variable supply of material;
    an air blowing assembly (104) powered by a battery (105) configured to generate an adjustable air flow;
    an activation controller (102) with settings to adjust an air flow intensity;
    a dispensing conduit (107) forming flow communication between an exit valve (110) of said container assembly (108), said air blowing assembly and at least one dispensing outlet (106) in a distal end of said dispensing conduit (107);
    wherein said air blowing assembly is fixed on a proximal end of said dispensing conduit and configured to blow air into said dispensing conduit;
    wherein an air inlet opening of said air blowing assembly is aligned with rotation axis of said air blowing assembly and said dispensing conduit on an airflow axis;
    wherein said container assembly comprising a flat bottom parallel to said airflow axis and in contact with external side of said dispensing conduit;
    wherein said exit valve is connected into said dispensing conduit at a location between said proximal end and said distal end of said dispensing conduit;
    wherein said activation controller is configured to activate the gardening apparatus in at least two modes of operation and switch between them:
        a first mode of operation wherein said exit valve is closed, such that air stream from air blowing assembly is pushed out from said dispensing conduit through said at least one dispensing outlet; and
        a second mode of operation wherein said exit valve is open, such that material contained in said container assembly is released into said dispensing conduit and pushed by air stream out from said dispensing conduit through said at least one dispensing outlet; and
        an additional mode of operation configured to alternately switch between said first mode of operation and said second mode of operation in at least one preset automated cycle duration, such that said at least one dispensing outlet alternately releases air stream and material with air stream;
    wherein said first mode of operation is used for removing plant litter from an area on the ground and said second mode of operation is used to spread material on said area on the ground.

Figure 4:
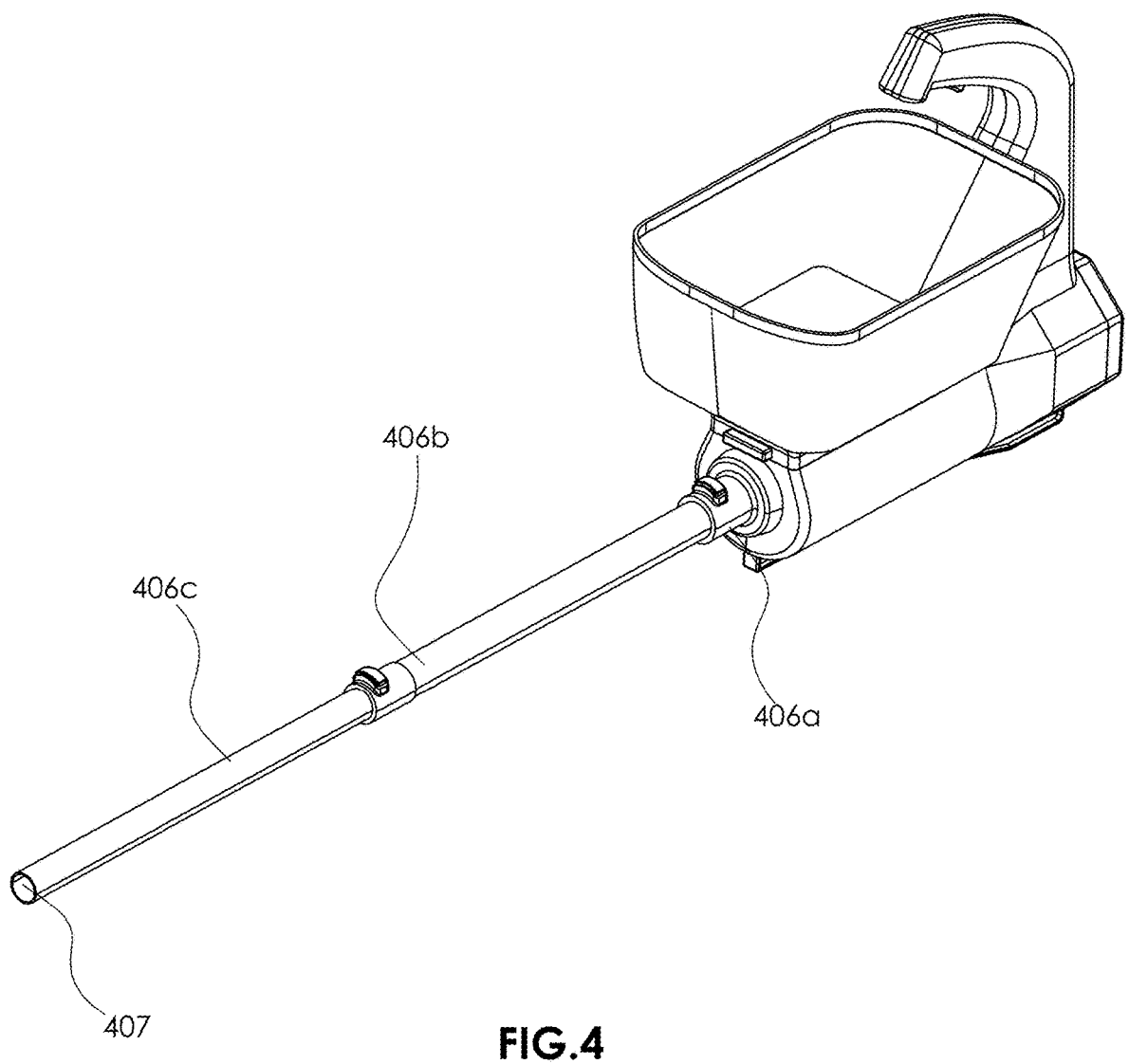

2. The gardening apparatus of claim 1 (FIG. 4), wherein length of said dispensing conduit (406a, 406b, 406c) is adjustable to change distance of said at least one dispensing outlet (407) from said activation controller.

3. The gardening apparatus of claim 1, wherein configuration of each of said at least one dispensing outlet is adjustable to change direction, pattern or range of release of air stream or material with air stream from said dispensing conduit.

4. The gardening apparatus of claim 1, wherein each of said at least one dispensing outlet comprising an adjustable nozzle to change distribution pattern of air stream or material with air stream from said dispensing conduit.

Figure 5A:
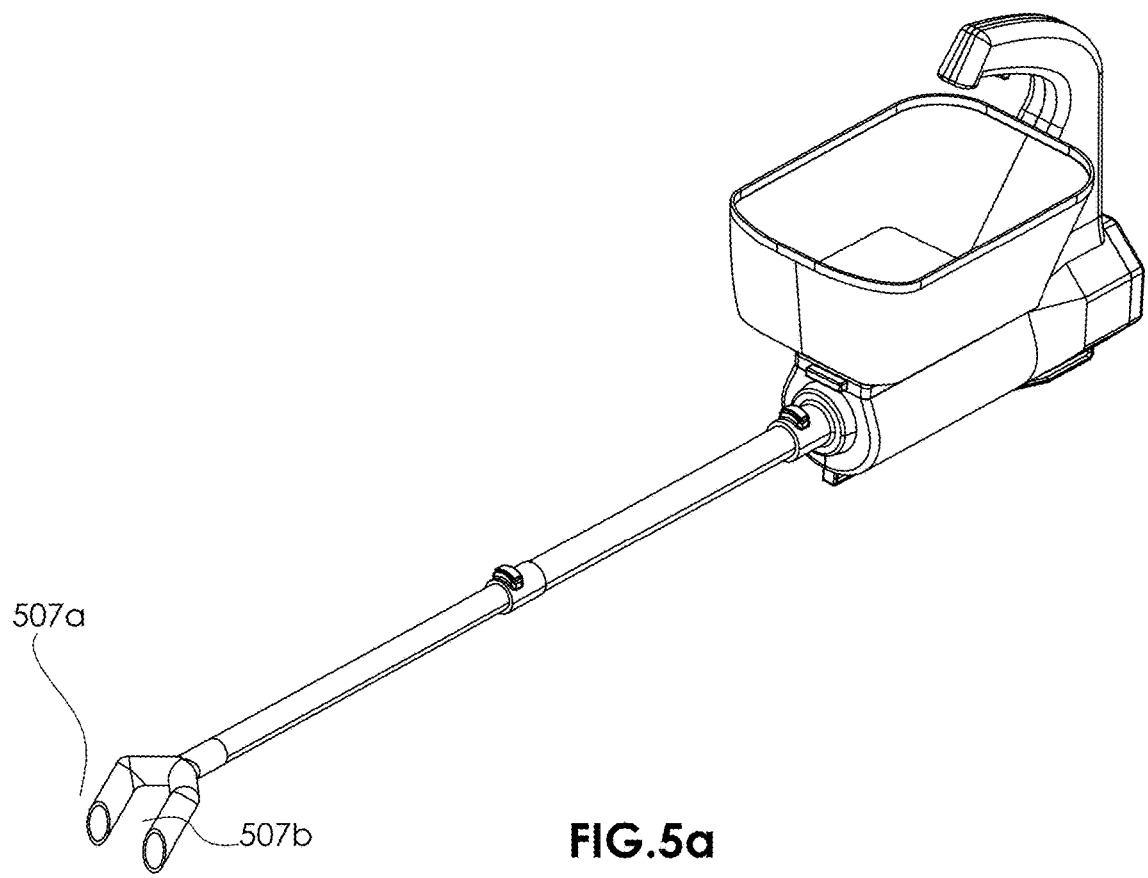
Figure 5B:
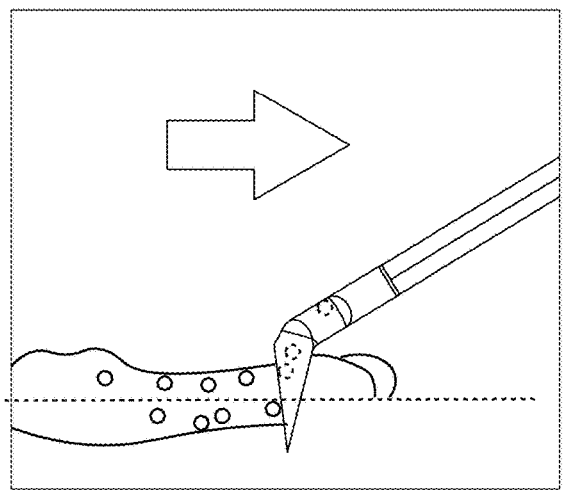
FIG. 5b illustrates a method of using the dispensing apparatus shown in FIG. 5a, wherein the dispensing outlets are partially inserted into the soil during the operation of the dispensing apparatus, and the dispensing apparatus is pulled such that the dispensing outlets plow the soil while releasing material contained in the dispensing apparatus into the soil.
Figure 5C:
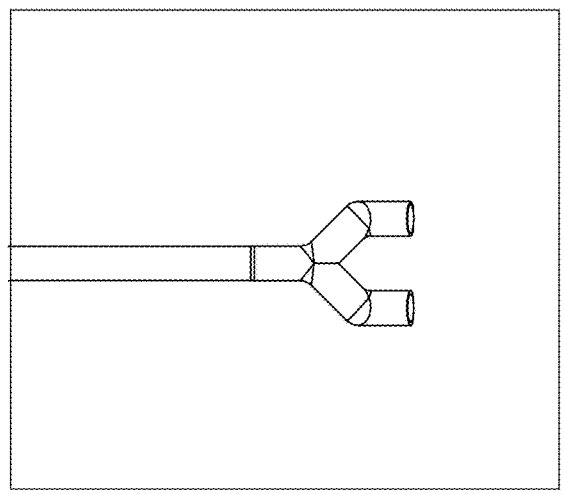

5. The gardening apparatus of claim 1 (FIG. 5a), wherein each of said at least one dispensing outlet (507a, 507b) comprises a sharpened edge configured for breaking up, loosening and turning over soil and for releasing air stream or material with air stream from said dispensing conduit into the soil or surface.

6. The gardening apparatus claim 1 (FIG. 5a), comprising two or more dispensing outlets (507a, 507b).

7. The gardening apparatus of claim 6 (FIG. 5a), wherein said two or more dispensing outlets (507a, 507b) are configured in a fork shape.

8. The gardening apparatus of claim 1, comprising two or more selectable preset automated cycle durations.

9. The gardening apparatus of claim 1, wherein aperture size of said exit valve is adjustable for controlling rate of release of material from said container assembly into said dispensing conduit.

10. The gardening apparatus of claim 1, wherein intensity of air stream entering said dispensing conduit is adjustable.

11. The gardening apparatus of claim 1, further comprising an additional container assembly (FIG. 11a, 11008b) configured to contain a variable supply of additional material, wherein said additional container assembly is in flow communication with said dispensing conduit through an additional exit valve, and wherein the dispensing apparatus may be activated by said activation controller in at least two additional modes of operation:
- a first additional mode of operation wherein said additional exit valve is closed while said exit valve is open, blocking passage of additional material into said dispensing conduit; and
- a second additional mode of operation wherein said additional exit valve is open while said exit valve is open, such that material contained in said container assembly (1108a) and additional material contained in said additional container assembly (1108b) are simultaneously released into said dispensing conduit, mixed together and pushed by air stream out from said dispensing conduit through said at least one dispensing outlet.

12. The gardening apparatus of claim 11, further comprising a third additional mode of operation wherein said additional exit valve is open while said exit valve is closed, such that additional material contained in said additional container assembly (FIG. 11a, 1108b) is released into said dispensing conduit and pushed by air stream out from said dispensing conduit through said at least one dispensing outlet.

13. The gardening apparatus of claim 1, further comprising a fork (FIG. 6a, 612) mounted on said distal end of said dispensing conduit for breaking up, loosening and turning over soil.

14. The gardening apparatus of claim 1, further comprising a carrying handle (FIG. 1a, 101) extending from adjacent to proximal end of the dispensing conduit.

15. The gardening apparatus of claim 14 (FIG. 1a), wherein said activation controller (102) is positioned on said carrying handle (101).

16. The gardening apparatus claim 1 (FIG. 7), further comprising a secondary carrying handle (FIG. 7, 711) extending from the dispensing apparatus in a position different than the position from which said carrying handle (701) extends from.

17. The gardening apparatus of claim 1, wherein said at least one dispensing outlet (FIG. 9a, 906) comprises a splitting element (914) for distributing the air stream or material with air stream released from said at least one dispensing outlet to two or more directions.

18. The gardening apparatus of claim 1, wherein said container assembly (FIG. 8a, 808) comprises an agitator (813) installed in proximity to said exit valve (810) and configured to facilitate passage of material contained in said container assembly through said exit valve.

19. The gardening apparatus of claim 1, wherein said container assembly is detachable.

20. A method for dispensing air stream or material with air stream onto a surface, the method comprising:
using a gardening apparatus comprising:
- a container assembly (108) configured to contain a variable supply of material;
- an air blowing assembly (104) powered by a battery (105) configured to generate an adjustable air flow;
- an activation controller (102) with settings to adjust an air flow intensity;
- a dispensing conduit (107) forming flow communication between an exit valve (120) of said container assembly (108), said air blowing assembly and at least one dispensing outlet (106) in a distal end of said dispensing conduit (107);
- wherein said air blowing assembly is fixed on a proximal end of said dispensing conduit (107) and configured to blow air into said dispensing conduit;
- wherein said exit valve (120) is connected into said dispensing conduit (107) at a location between said proximal end and said distal end of said dispensing conduit (107);
- wherein an air inlet opening of said air blowing assembly is aligned with rotation axis of said air blowing assembly and said dispensing conduit on an airflow axis;
- wherein said container assembly comprising a flat bottom parallel to said airflow axis and in contact with external side of said dispensing conduit;
- wherein said activation controller (102) is configured to activate the gardening apparatus in at least two modes of operation and switch between them:
- a first mode of operation wherein said exit valve (120) is closed, such that air stream from air blowing assembly (104) is pushed out from said dispensing conduit (107) through said at least one dispensing outlet (106); and
- a second mode of operation wherein said exit valve (120) is open, such that material contained in said container assembly (108) is released into said dispensing conduit (107) and pushed by air stream out from said dispensing conduit (107) through said at least one dispensing outlet (106); and
- an additional mode of operation configured to alternately switch between said first mode of operation and said second mode of operation in at least one preset automated cycle duration, such that said at least one dispensing outlet alternately releases air stream and material with air stream;
- wherein said first mode of operation is used for removing plant litter from an area on the ground and said second mode of operation is used to spread material on said area on the ground;
activating said gardening apparatus in at least one of said three modes of operation over a designated surface.

\* \* \* \* \*